United States Patent

Komatsu et al.

[11] Patent Number: 5,098,787
[45] Date of Patent: Mar. 24, 1992

[54] MODIFIED ORIENTED POLYACETAL PRODUCT

[75] Inventors: Tamikuni Komatsu, Fuji; Tadao Kanuma, Kyoto, both of Japan

[73] Assignee: Asahi Kasei Kogyo Kabushiki Kaisha, Osaka, Japan

[21] Appl. No.: 263,405

[22] Filed: Oct. 27, 1988

[30] Foreign Application Priority Data

Oct. 30, 1987 [JP] Japan .................. 62-275099
Dec. 11, 1987 [JP] Japan .................. 62-313768
Mar. 16, 1988 [JP] Japan .................. 63-62916

[51] Int. Cl.$^5$ .................. C08F 4/00; B32B 7/12
[52] U.S. Cl. .................. 428/343; 428/525; 428/524; 428/346; 528/241; 528/249
[58] Field of Search .................. 428/524, 525, 343; 528/241, 249

[56] References Cited

U.S. PATENT DOCUMENTS

| | | |
|---|---|---|
| 3,721,598 | 3/1973 | Marcey et al. |
| 4,254,172 | 3/1981 | Takahashi et al. .................. 428/131 |
| 4,464,435 | 8/1984 | Hattori et al. .................. 428/524 X |
| 4,668,761 | 5/1987 | Aoshima et al. |
| 4,816,107 | 3/1989 | Collins et al. .................. 428/525 X |

FOREIGN PATENT DOCUMENTS 748835  5/1956  United Kingdom .

OTHER PUBLICATIONS

Chemical Abstracts, vol. 77 (1972) 141085h.

Primary Examiner—George F. Lesmes
Assistant Examiner—D. R. Zirker
Attorney, Agent, or Firm—Birch, Stewart, Kolasch & Birch

[57] ABSTRACT

There are disclosed a modified oriented polyacetal product, the surface of said product being coated partly or entirely with a phenolic compound-polyacetal composite layer, the application thereof and a process for preparing the same.

10 Claims, 1 Drawing Sheet

MODIFIED ORIENTED POLYACETAL PRODUCT

BACKGROUND OF THE INVENTION

1. Field of the Invention

The present invention relates to oriented polyacetal products which have modified surfaces, particularly to such products having surfaces with improved affinity for other materials. The present invention also relates to a process for producing such products.

2. Discussion of the Related Art

By virtue of their high tensile strength and being superior in fatigue endurance, chemical resistance, and water repellency, polyacetals are used extensively as engineering plastics or as raw materials of synthetic fibers in various areas. In recent years, improvements of polyacetals of high elastic moduli and high strength have been developed, and as a result they have come to attention as materials suitable for composites with elastomers, plastics, or other materials.

However, because of the deficiency of polyacetals in their affinity for dissimilar materials, there have been difficulties in adhering polyacetals firmly to such materials, and when polyacetals are subjected to treatments such as plating, painting, coating, or printing, it is difficult to fix the applied material securely on their surfaces.

To overcome these difficulties, various surface treatments have been practiced including; mechanical surface roughening with sandpaper or sandblasting; physical surface etching by corona discharge, plasma discharge, or the like; and chemical surface etching with potassium dichromate, phosphoric acid, fluorine, or other reagents. But, these treatments only have some adhesion-enhancing effect based on physical actions such as an anchor action, which hardly achieve adhesion-enhancing effect based on chemical bonds. Therefore, the result of these treatments are not always satisfactory in the permanency of, peel resistance, or dynamic-fatigue resistance of the bond. The above treatments have also little adhesion-enhancing effect, because non crystalline portions that are relatively receptive to chemical etching are decreased by molecular orientation and hence these oriented polymers are virtually chemically inert.

On the other hand, British Patent No. 941,647 discloses a method comprising coating a polyacetal or other plastics to which it is to be adhered, with an unoriented polyacetal solution in a fluorine-containing organic solvent such as 2H-hexafluoro-2-propanol, and adhering the two materials together and evaporating the solvent from the applied solution to form an unoriented polyacetal coating. Also disclosed is a method comprising coating a metal or other materials to which a polyacetal is to be adhered, with such a solution as mentioned above, followed by evaporation. That is, these methods comprise interposing an unoriented polyacetal layer between a polyacetal and the intended adherent material. Besides 2H-hexafluoro-2-propanol, a number of organic solvents including phenols such as p-chlorophenol have been investigated up to now to dissolve polyacetals [J. Polym. Sci., Vol. 1,p. 185 (1959)]. According to the present inventors' study, however, the adhesive strength of roughened surfaces of unoriented polyacetals to rubbers, when the surfaces were coated with an unoriented polyacetal solution in the above-mentioned fluorine-containing organic solvent, or in a phenol, and dried, was decreased relative to the case where no such solution was applied. The same treatment of oriented polyacetals was found to decrease the adhesive strength similarly to the effect noted for the treatment of the unoriented polyacetals, and thus no useful effect from the treatment was observed. The use of adhesives of the epoxy resin type for the bonding also exhibited no adhesion-enhancing effect.

Moreover, none of the resorcinol-formaldehyde-rubber latex aged products, viz. RFL., and the initial stage condensate of resorcinol with formaldehyde viz. resol, which are well known as adhesives for rubber-reinforcing fiber cords and as adhesives for wood, exhibit any effect of enhancing the adhesive strength of polyacetals.

The reason why polyacetals are lacking, as described above, in affinity for dissimilar materials is that polyacetals, unlike nylons and cellulosics that are highly polar, have no functional group at the surface. Molecular orientation makes this tendency more noticeable.

SUMMARY OF THE INVENTION

The present inventors made intensive studies for the purpose of developing oriented polyacetal products which have high affinity for dissimilar materials. As a result, it has been found that when surfaces of oriented polyacetal products are treated with a phenolic compound under specific conditions, polyacetal-phenolic compound composite layers having high affinity for dissimilar materials are unexpectedly formed on the surfaces. Based on this finding, the present invention has been accomplished.

That is, according to the present invention, there are provided (i) a modified oriented polyacetal product, the surface of said product being coated partly or entirely with a polyacetal-phenolic compound composite layer, (ii) various articles based on said product by modifying it in accordance with the intended end uses of the individual articles, and (iii) processes for producing said product and articles.

BRIEF DESCRIPTION OF THE DRAWINGS

FIG. 1 is a block flow diagram showing an example of a production process for carrying out the present invention. In this drawing, reference letters and number indicate the following: A: an oriented polyacetal product, 1: a feed roller, 2: a surface-roughening section, 3: an activating section, 4: a heat treatment section, 5: an adhesive applying section, 6: a heat treatment section, and 7: a winding roller.

DETAILED DESCRIPTION OF PREFERRED EMBODIMENTS

Any acetal homopolymers and copolymers may be used as a base material for the surface-modified oriented polyacetal product (for simplification, "product" is often omitted herein after) of the present invention. The homopolymers are produced usually by polymerizing formaldehyde in the presence of an ionic polymerization initiator and have number average molecular weights of 15,000 to 200,000 (MI 0.1-50), preferably 25,000 to 100,000 (MI 0.5-30). The copolymers are typically polyoxymethylene copolymers having one or more types of ether segments or polyether segments in the molecular chain. Such copolymers are generally produced by copolymerizing a cyclic ether with at least one alkylene oxide and have number average molecular weights of 10,000 to 200,000 (MI 0.1-50), preferably 20,000 to 100,000 (MI 0.5-30). Examples of such copolymers include those having 90-99.6 mole%, preferably 95-99.6 mole%, of recurring oxymethylene units and 0.4-10 mole%, preferably 0.4-5 mole%, of ether segments which have each at least two carbon atoms and are scattered in the molecular chain. When the content of oxymethylene units is less than 90 mole%, the strength and elastic modulus of the copolymer are undesirably low and when this content exceeds 99.6 mole%, the strength and elastic modulus of the copolymer are substantially equal to those of the homopolymer.

In the present invention, the above defined polyacetal is used in a uniaxially or polyaxially oriented state. Such oriented polymers are usually produced from unoriented polyacetals prepared by melt extrusion or the like, by molecular orientation according to, for example, the stretching, rolling, or hydrostatic-extruding method. These oriented polyacetals can be used generally when having tensile elastic moduli at least 4GPa and tensile strengths of at least 0.6GPa. It is advantageous to use oriented polyacetals of higher elastic moduli and higher strengths, that is, those having tensile elastic moduli of 10GPa and more, preferably 20GPa and more, particularly 30GPa and more, and tensile strengths of 1.0GPa and more, preferably 1.3GPa and more, particularly 1.5GPa and more.

The shape of these oriented polyacetals for use in the present invention is optional. Any shape can be used that is chosen as desired from shapes, for example, of films, sheets, filaments, blocks, tubes, rods, spheres, pellets, and flakes.

In the next place, the phenolic compound to be used in the present invention to form a composite layer jointly with a surface part of the above defined oriented polyacetal is an aromatic compound having at least one aromatic ring and at least one hydroxy group linked to the aromatic ring. Beside the hydroxy group, this phenolic compound may have one or more substituents including alkyl, haloalkyl, hydroxyalkyl, aminoalkyl, alkenyl, alkynyl, aryl, halogen, formyl, carboxy, carbonyl, ether, epoxy, amino, imino, cyano, cyanoacryloyloxy, acryloyloxy, nitro, sulfo, mercapto, triazinyl, acyl, carbamoyl, and thiocarbamoyl radicals. Such phenolic compounds include, for example, phenol, resorcinol, catechol, hydroquinone, pyrogallol, phloroglucin, aminophenol, dihydroxyaniline, cyanophenol, nitrophenol, picric acid, cresol, xylenol, carvacrol, thymol, naphthol, resorcinolaldehyde, resorcinolhydroquinone, salicylic acid, hydroxybenzoic acid, hydroxyphenylacetic acid, protocatechuic acid, gentisic acid, resorcinol acid, orsellinic acid, caffeic acid, umbellic acid, gallic acid, 3-hydroxyphthalic acid, bisphenol A,2,2-bis(4-hydroxyphenyl)hexafluoropropane; halophenols such as chlorophenol, bromophenol, and polyhalophenols; hydroxybenzyl alcohols such as monohydroxybenzyl alcohol, dihydroxybenzyl alcohol, and trihydroxybenzyl alcohol; m-hydroxybenzylamine, and p-hydroxybenzylsulfonic acid. Of these compounds, preferred are dihydroxybenzenes such as resorcinol, catechol, and hydroquinone; trihydroxybenzenes such as pyrogallol; aminophenols such as aminophenol and dihydroxyaniline; halophenols such as chlorophenol; and hydroxybenzyl alcohols. These phenolic compounds may be used alone or in combination one with another. Moreover, a mixture of each phenolic compound with either a resorcinol-formaldehyde condensate or a resorcinol-formaldehyde-latex aged product can be used effectively as a liquid for the treatment. The use of this mixture to adhere the oriented polyacetal to other materials, particularly to rubbers, provides adhesion much stronger and more resistant to thermal ageing than does the use of the phenolic compound alone. The resorcinol-formaldehyde condensate, usually called RF, is produced by the reaction of resorcinol with formaldehyde either in the absence of any catalyst or in the presence of an acid or alkali catalyst. In this reaction, up to 2 moles of formaldehyde is used per 1 mole of resorcinol. The aged resorcinol-formaldehyde-latex, usually called RFL, is produced by adding a latex to said RF and aging the mixture. Suitable latexes for this RFL include a natural rubber latex, styrene-butadiene rubber latex, vinylpyridine terpolymer latex, nitrile rubber latex, silicone rubber latex, urethane rubber latex, chlorosulfonated-polymer latex, polyvinyl chloride latex, polyvinylidene chloride latex, and mixtures of these latexes. For adhering the oriented polyacetal to vulcanized rubbers, preferred latexes are of natural rubber, styrene-butadiene rubber, vinylpyridine terpolymer, and nitrile rubber.

When a solution of the phenolic compound is used for the treatment, the concentration of phenolic compound is generally at least 10% by weight, preferably at least 20% by weight, particularly preferably from 30% by weight, to saturation. When the RF-phenolic compound mixture is used for adhering rubbers, the content of RF as solids in the mixture is generally from 0.01 to 2 parts by weight per 1 part by weight of the phenolic compound. If this content is less than 0.01 part by weight, the effect of the RF will not be exhibited sufficiently. If the content exceeds 2 parts by weight, an adverse effect will be produced occasionally. As to the ratio of RFL to the phenolic compound, the content of RFL as solids is generally from 0.02 to 0.2 part by weight per 1 part by weight of the phenolic compound. If this content is less than 0.02 part by weight, the effect of the RFL will not be exhibited sufficiently. If this content exceeds 0.2 part by weight, again an adverse effect will be produced occasionally.

There is no particular restriction on the means of applying the above stated modifying agents on the oriented polyacetal. Generally, the surface to be treated of the oriented polyacetal is contacted or overlaid with each modifying agent by dipping, painting, spraying, placing in an atmosphere of gasified modifying agent, or other methods and the resulting polyacetal is subjected to heat treatment at a temperature of up to the melting point, preferably the softening point, of the polyacetal, whereby a surface-modified oriented polyacetal can be prepared. The heat treatment can be generally completed in a period of 10 seconds to 10 minutes at temperatures of 100° to 190° C. depending upon the shape of the oriented polyacetal to be modified and the species of phenolic compound used. When the oriented polyacetal is treated by contacting with the phenolic compound in melted or gaseous form, the contact is generally complete in 0.1 to 10 seconds. Prior to these treatments, the surface to be modified of the oriented polyacetals may be roughened by conventional methods to enhance the wettability and increase the specific area of the surface, thereby facilitating the treatments. It is also possible to accelerate the treatment by conducting it in the presence of an acid, alkali, or peroxide as a catalyst. Moreover, copolymerization or crosslinking can be caused simultaneously with the formation of the composite layer by the joint use of ammonia, an amine, alcohol, epoxy compound, acrylic compound, isocyanate compound, peroxide, or crosslinking agent.

The chemical structure of the composite layer thus formed at a surface of the oriented polyacetal is not yet elucidated, but the composite layer may have a structure wherein; a strong intermolecular force causes the molecules of the phenolic compound to be an inclusion in a network of polyacetal molecules; the polyacetal and the phenolic compound are in a chemically combined state; or both the states coexist. The composite layer may not necessarily arise simply from the physical adsorption of phenolic compound on the surface of polyacetal. This assumption is supported by the facts that after the formed composite layer is washed several times with a solvent of phenolic compounds, no weight loss is observed; that absorptions typical of a phenolic resin component are observed in the infrared absorption spectra of parts of the composite layer; and that absorptions typical of a similar phenolic resin component are also observed in the infrared absorption spectra of samples prepared by dissolving parts of the composite layer in a solvent for the polyacetal and drying up the solution.

It is conceivable that the composite layer formed on the oriented polyacetal surface modified by treating with a mixture of the phenolic compound and either RF or RFL is in a state where RF or RFL are occluded in a network of phenolic resin which is formed by the reaction of the phenolic resin with a part of the polyacetal.

The modified oriented polyacetal of the present invention may be covered entirely or partly with the composite layer. Depending upon conditions of the treatment, the thickness of the composite layer ranges generally from several μm to several mm.

Further, adhesives suitable for the end uses of the above individual modified oriented polyacetal products can be applied on surfaces of the products. These adhesive-coated, modified, oriented polyacetal products may be coated with dissimilar materials or used to form composites with them. For instance, when the modified oriented polyacetal is coated with an elastomer or used as a reinforcement for an elastomer, an adhesive for elastomer purposes is applied on the modified oriented polyacetal. A proper adhesive is chosen according to the kind of elastomer used. There is no particular restriction on the elastomer to use. An arbitrary one can be chosen from conventional elastomers. Suitable elastomers include, for example, natural rubber, SBR, IR, BR, EPR, butyl rubber, polyisobutylene, chloroprene rubber, neoprene rubber, NBR, polyurethane rubber, polysulfide rubber, halogenated rubber, acrylic rubber, chlorohydrin rubber, fluororubber, silicone rubber, various thermoplastic elastomers, and compositions of these elastomers, though not limited to these elastomers.

As to favorable adhesives for these elastomers, RFL's are used generally for vulcanized rubbers, polyvinyl chloride latexes are used for polyvinyl chloride, polyvinylidene chloride latexes are used for polyvinylidene chloride, and urethane rubber latexes are used for polyurethane. Other suitable adhesives for the elastomers include those of the urea family, melamine family, isocyanate family, phenolic family, polyamide family, urethane family, cyanoacrylate family, acrylic family, polyester family, nitrocellulose family, vinylacetate resin family, epoxy resin family, vinyl acetal family, and vinyl alcohol family, and denatured products from these adhesives.

When the modified oriented polyacetal is coated with a plastic or used as a reinforcement for a plastic, an adhesive suited to the plastic is chosen and used. There is no particular restriction on the plastic. For example, usable plastics are epoxy resins, polyamide resins, polyester resins, polyolefin resins, polyether resins, polycarbonate resins, urea resins, silicone resins, fluoro resins, vinyl chloride resins, vinylidene chloride resins, acrylic resins, phenolic resins, polyvinyl alcohol resin, polysulfone resins, polystyreneresins, polyethersulfone resins, polyphenylene sulfide resins, and compositions of these resins, though not limited to these. For adhering plastics, adhesives suited for each plastic are used.

As the occasion demands, the surface-modified oriented polyacetal of the present invention can be formed into composites with concrete, papers, woods, metals, metal compounds, glasses, ceramics, leather, etc., besides elastomers and plastics, by applying adhesives suited for the purposes of individual products.

For the purpose of providing chemical and/or physical properties to polyacetals which will be used in the present invention, it is possible to incorporate into them various elastomers, e.g., polyamide elastomers, polyester elastomers, and polyurethane elastomers, glass fiber, carbon black, polyurea, polythiourea, phenol resins, urea resins, etc. Moreover, intended properties can be imparted to the polyacetal, if necessary, be incorporating additives such as antioxidants, heat stabilizers, flame retardants, oils, lubricants, plasticizers, antistatic agents, colorants, and softening agents and various fillers, e.g. carbon fiber whiskers, synthetic fibers, and ceramics.

Figure 1:
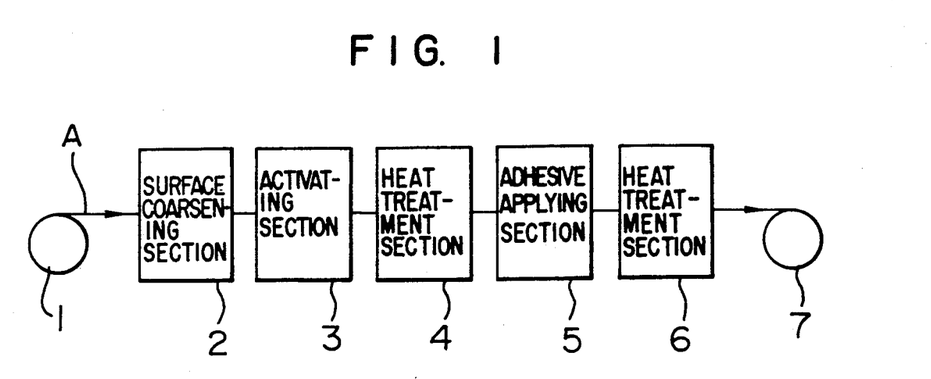

Referring now to the accompanying drawings, the process of the present invention will be described illustratively. FIG. 1 is a block diagram showing an example of a continuous process for producing a surface-modified oriented polyacetal in accordance with the present invention. As shown in FIG. 1, an oriented polyacetal A is sent from a feed roller 1 to a roughening section 2, where a surface of the polyacetal A is roughened, then in an activating section 3 the roughened surface is coated with a phenolic compound or its mixture with RF or with RFL as stated above, the coated polyacetal is heated in a heat treating section 4, then the coated surface is overlaid with an adhesive layer by passing the polyacetal through an adhesive applying section 5 and then a heat treating section 6, and the resulting treated polyacetal is wound up around a winding roller 7. When a phenolic compound in a molten or gaseous state is used in this process, the polyacetal in the activating section 3 is activated by contact with the phenolic compound and simultaneous reaction therewith. In the process of FIG. 1, other treatment sections can be incorporated, if necessary, such as a take-up and take-off section, annealing section, and cooling section. The heat treatments in sections 4 and 6 can be carried out by conventional heating means including external heating means, e.g. steam and electrical heaters, and internal heating means using, e.g. high-frequency waves, infrared rays, far infrared rays, and lasers.

The modified oriented polyacetal of the present invention, having phenolic hydroxy groups and other functional groups at the modified surface, is superior in reactivity and chemical affinity of the modified surface, which therefore exhibits firm and permanent adherence on sticking, plating, painting, coating, dyeing, printing, etc. In addition, the modified oriented polyacetal product prepared by applying an adhesive on the modified surface according to the end use of the product, when adhered to dissimilar materials, forms firm and permanent bonds which are superior in dynamic-fatigue endurance, peel resistance, thermal-degradation resistance, etc. The adhesive strength of these composites to dissimilar materials is at least 150 g/mm$^2$ in general, at least 250 g/mm$^2$ in favourable cases, at least 300 g/mm$^2$ in more favourable cases, at least 380 g/mm$^2$ in particularly favourable cases, and 1500 g/mm$^2$ at the highest.

Oriented polyacetals for use in the present invention have not only high elastic moduli and high tenacity but also a specific gravity up to 5.5 times lower than that of steel, do not buckle, and are good in many respects including flextural fatigue endurance, durability, creep resistance, moderateness of elongation, hardness, S-S properties, dimensional stability, low thermal shrinkage, coefficient of linear expansion, heat resistance, chemical resistance, sea water resistance, solvent resistance, hot water resistance, corrosion resistance, cryogenic temperature resistance, safety, and shapability. Oriented polyacetals in fibrous form of 0.01 μm to several mm diameter are available. In particular, those having diameters of mm orders have such high tenacity that the strength of one filament thereof corresponds to that of thousands to tens of thousands of conventional high tenacity synthetic filaments. Accordingly, these oriented polyacetals can be processed very easily to form composites and have strengths, dimensions, shapes, and properties very close to those of conventional steel cords, and are available in any shape selected as desired from round rod, square rod, special profile, filament, staple, chip, tube, sheet, tape, film, and other shapes. The modified oriented polyacetal having such characteristics of oriented polyacetals is may be used in a wide variety of applications. These possible applications include articles necessary to have high elastic moduli and high strength, for example, composites with elastomers such as tire cords, beads for tires, cable beads for tires, and paddings (reinforcements) of belts, hoses, pipes, sheets, diaphragm valves, snow chains, rolls, and of bearings; composites with plastics such as honeycombs, gear wheels, skis, fishing rods, printed circuit boards, and sheets, plates, containers, and structures of various fiber-reinforced plastics; civil engineering building materials or various injection molded products reinforced with fibers such as reinforcements for concrete, fiber reinforcements for concrete slate, materials for concrete shield construction, and geogrid; elastomer-or resin-coated ropes, cables, tension members, braids, nets, tents, sails, filter cloths, canvases and apparel, sling belts, and other knitted, woven or unwoven fabrics; sporting or hobby goods, or home applicances such as guts, fishing lines, handicraft materials, art flowers, artificial lawn and brushes; materials for information or communication media, such as base materials of recording tapes; and other composites with papers, pulps, woods, metals, metal compounds, glasses, ceramics, or leathers. Further, the thermoplastic nature of polyacetals modified according to the present invention enables them to be used in hot-melt adhesives and other various adhesives.

The present invention is illustrated in more detail with reference to the following examples which are not intended to place any restriction on the invention. In the following examples, oriented polyacetals were prepared according to the method described in Japanese Patent Application Kokai No. 60-183122. Properties of oriented polyacetals and their modification products were evaluated in the following ways.

(1) Tensile elastic modulus and tensile strength

Determined in accordance with JIS K7113 (1981) by using an Instron tensile tester. The tensile elastic modulus was evaluated by using a differential transformer type of strain gauge. The tensile strength was evaluated by winding a test specimen several turns on two stainless steel reels with a diameter of 160 mm separated by 20 cm and drawing the specimen at a strain rate of 10 cm/min. The cross-sectional area of the specimen, necessary to calculate the tensile elastic modulus and the tensile strength, was calculated from the weight of the specimen having a definite length and from the apparent density of the specimen determined in the following way.

(2) Apparent density

Measured at 20°±0.5° C. in accordance with the sink and float method of JIS K7112 (1980) by using an aqueous solution of anhydrous potassium carbonate as a medium of known density.

(3) Adhesive strength

Determined in accordance with JIS L 1017 (1983) method A (T test). That is, an end portion (10 mm long) of a surface-modified oriented polyacetal specimen (B) 210 mm long was inserted into a compounding partner material, thereby preparing a composite specimen as shown in FIG. 2 or 3, and the stress (withdrawal force) exerted when the polyacetal specimen was withdrawn from the partner material was measured, thereby determining the adhesive strength from the following equation.

$$\text{Adhesive strength (g/mm}^2\text{)} = \frac{\text{Found withdrawal force (g)}}{\pi \times \text{diameter (mm)} \times \text{length (10 mm) of inserted portion of polyacetal specimen}}$$

The diameter of the polyacetal specimen was calculated from its weight and apparent density.

Figure 2:
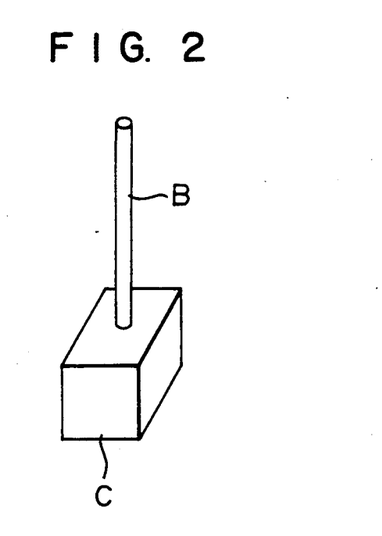
FIGS. 2 and 3 are perspective views of specimens assembled for measuring the adhesive strength of a surface-modified oriented polyacetal product to partner materials with which composites are formed. In these drawings, reference letters are as follows: B: the specimen of the surface-modified oriented polyacetal, C: the specimen of one of the two materials which consists mainly of an elastomer, and D: the specimen of the other of the materials which consists mainly of a plastic.
Figure 3:
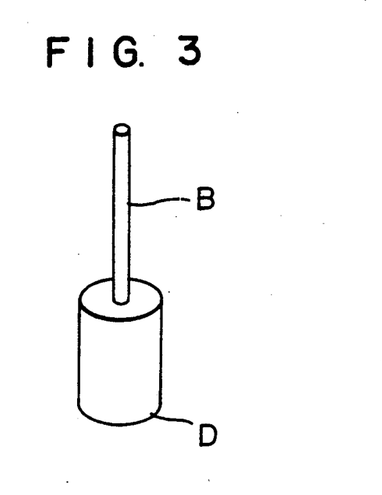

FIG. 2 shows a polyacetal composite specimen wherein the composite partner consists mainly of an elastomer and the cube C has the size: 10 mmL×20 mmW×10 mmH. FIG. 3 shows a composite specimen wherein the cylinder D has dimensions of 10 mm Dia.×10 mmH.

(4) Preparation of samples

Preparation Example 1: Preparation of phenolic compound solution

The phenolic compound to be used was dissolved in water or an organic solvent at 23° C. to a concentration of 10% by weight to saturation, thereby making up the intended solution.

Preparation Example 2: Preparation of RF liquid

A mixture of 16.2 parts by weight (hereinafter parts are all by weight) of resorcinol, 20.0 parts of formalin of 37 wt% concentration, 0.41 part of sodium hydroxide, and 373.8 parts of water was stirred at 23° C. for 6 hours, thereby making up the intended RF liquid.

Preparation Example 3: Preparation of RFL liquid

A mixture of 16.2 parts of resorcinol, 20.0 parts of formalin of 37 wt% concentration, 0.41 part of sodium hydroxide, and 373.8 parts of water was stirred at 23° C. for 6 hours. To the resulting liquid were added 282.2 parts of a vinylpyridine terpolymer latex (solid content 40 wt%) (supplied by Sumitomo-Naugatuck Inc., tradename: Pyratex), 43.3 parts of an SBR latex (solid content 32 wt%)(supplied by Nippon Zeon Co., Ltd., tradename: J-9049), 11.8 parts of a natural rubber latex (solid content 60 wt%)(supplied by HMPB Co., tradename: H & C), and 233.3 parts of water. This mixture was stirred at 23° C. for 24 hours and then 18.0 parts of aqueous ammonia of 28 wt% concentration was added, thereby making up the intended RFL liquid.

Preparation Example 4: Preparation of oriented polyacetal products

Pellets of Tenac 3010 (the registered trademark of an acetal homopolymer supplied by Asahi Chemical Co., Ltd.) were melt-extruded at 200° C. to prepare polyacetal tubes, which were then each stretched continuously under pressure giving oriented polyacetal products having tensile elastic moduli of 4 to 55GPa.

(5) Example of analyzing modified surfaces of oriented polyacetal products

An oriented polyacetal tape having a tensile elastic modulus of 40GPa was treated with resorcinol, (a representative example of the phenolic compounds usable in the present invention which exhibited the highest modifying effect). Pieces of the oriented polyacetal cut into approx. 1 cm lengths were immersed in a methanolic solution containing 40 wt% of resorcinol, then removed, and air-dried, thereby coating resorcinol uniformly on the pieces. These pieces were subjected to dry heat treatment at 160° C. for 3 minutes, then washed three times with methanol, and dried (the dried product is designated as sample 1). This sample 1 showed about 4% increase in the weight over the untreated pieces. On extraction with methanol for 1 hour, this sample showed little change in weight (the extraction product is designated as sample 2). In the FT-IR spectra of surface portions of this sample 2, absorptions due to a form of resorcinol resin were observed. Then, surface layers of sample 2 were dissolved in hexafluoroisopropanol, methanol was added to the resulting solution, and the formed precipitate was filtered and washed with methanol. After freeze drying of the filtrate, resorcinol was found in the residual prepipitate. The above precipitate filtered off was dried and kneaded together with KBr. The kneaded mixture was dried, compressed, and subjected to FT-IR spetrometry. The spectrum showed absorptions due to polyacetal and absorptions, though slight, due to a form of resorcinol resin. The above results have revealed that resorcinol is strongly incorporated by reaction into the polyacetal.

EXAMPLES 1-7 AND COMPARATIVE EXAMPLE 1

Oriented polyacetals in filament form having properties shown in Table 1 were each sandblasted with alumina of no. 120 grade, immersed in an aqueous solution containing 40 wt% of resorcinol for 30 seconds at 23° C., then taken out, subjected to dry heat treatment at 160° C. for 10 seconds, immersed again in an aqueous solution of RFL (Preparation Example 3) at 23° C. for 30 seconds, then taken out, dried at 120° C. for 5 minutes, and heat-treated at 160° C. for 5 minutes. Each of these treated polyacetals and a compounded crude rubber for automotive tire carcass purposes were put together, and heat-treated in a hot press at 35 kg/cm$^2$ and 150° C. for 30 minutes to prepare a composite specimen as shown in FIG. 2. The oriented polyacetal was withdrawn from the rubber piece to evaluate the adhesive strength. Results of the tests on all the above treated oriented polyacetals are shown in Table 1. For comparison, the above procedure was followed except that the treatment with resorcinol was omitted. Results of this comparative experiment are also shown in Table 1.

TABLE 1

| | Oriented polyacetal | | | | Withdrawal force (Kgf) | Adhesive strength (g/mm$^2$) |
|---|---|---|---|---|---|---|
| | Tensile elastic modulus (GPa) | Tensile strength (GPa) | Elongation (%) | Diameter (mm) | | |
| Example 1 | 4 | 0.6 | 20~25 | 1.01 | 12.6 | 400 |
| Example 2 | 10 | 1.0 | 14~16 | 0.80 | 15.1 | 600 |
| Example 3 | 20 | 1.3 | 9~11 | 0.65 | 14.3 | 700 |
| Example 4 | 30 | 1.5 | 7~9 | 0.58 | 18.2 | 1000 |
| Example 5 | 40 | 1.7 | 6~8 | 0.50 | 18.0 | 1150 |
| Example 6 | 50 | 1.3 | 4~6 | 0.44 | 15.9 | 1150 |
| Example 7 | 55 | 1.0 | 4~6 | 0.44 | 8.2 | 600 |
| Comparative Example 1 | 40 | 1.7 | 6~8 | 0.50 | 2.0 | 130 |

As is evident from Table 1, the surface-modified oriented polyacetal of the present invention has markedly strong adhesion to the rubber.

EXAMPLES 8-20 AND COMPARATIVE EXAMPLE 2

The same oriented polyacetals in filament form as used in Example 5 was sandblasted with alumina of No. 120 grade, each immersed in solutions of 40 wt% of various phenolic compounds listed in Table 2 for 30 seconds, then taken out, and subjected to dry heat treatment at 160° C. for 10 seconds. Thereafter, RFL treatment and then rubber adhesion were conducted in the same manner as in Examples 1-7 to prepare composite specimens. Results of testing these specimens for adhesive strength are shown in Table 2. For comparison, the above procedure was followed except that the treatment with phenolic compounds was omitted. Results of this comparative experiment are also shown in Table 2.

TABLE 2

| | Oriented polyacetal | | Phenolic compound | (solvent) | Withdrawal force (kgf) | Adhesive strength (g/mm$^2$) |
|---|---|---|---|---|---|---|
| | Diameter (mm) | Elastic modulus (GPa) | | | | |
| Example 8 | 0.5 | 40 | Resorcinol | (water) | 18.0 | 1150 |
| Example 9 | 0.5 | 40 | Phloramine | (THF) | 10.0 | 640 |
| Example 10 | 0.5 | 40 | Catechol | (water) | 9.0 | 570 |
| Example 11 | 0.5 | 40 | p-Chlorophenol | (THF) | 8.4 | 540 |
| Example 12 | 0.5 | 40 | m-Aminophenol | (THF) | 8.0 | 510 |
| Example 13 | 0.5 | 40 | m-Cresol | (THF) | 7.6 | 480 |
| Example 14 | 0.5 | 40 | 2,4-Dihydroxybenzaldehyde | (THF) | 6.9 | 440 |
| Example 15 | 0.5 | 40 | Gallic acid | (THF) | 6.5 | 410 |
| Example 16 | 0.5 | 40 | Pyrogallol | (THF) | 6.1 | 390 |
| Example 17 | 0.5 | 40 | 3,5-Xylenol | (THF) | 5.9 | 380 |
| Example 18 | 0.5 | 40 | o-Nitrophenol | (THF) | 5.4 | 340 |
| Example 19 | 0.5 | 40 | Phenol | (THF) | 5.3 | 340 |
| Example 20 | 0.5 | 40 | 3,5-Dihydroxybenzoic acid | (THF) | 4.9 | 310 |
| Comparative Example 2 | 0.5 | 40 | None | | 2.0 | 130 |

It is considered that such strong adhesion to the rubber as shown in Table 2 results from the surface modification of the oriented polyacetal according to the process of the present invention. It may be noted that oriented polyacetals washed with THF after treatment with phenolic compounds exhibited similar adhesive strengths as well.

As is evident from Table 3, the adhesive strength was enhanced by the treatment with the resorcinol-RF liquid mixture. In Examples 23-26, much rubber clung to the surface-modified oriented polyacetals after withdrawing thereof. The result of a thermal-ageing resistance test at 121° C. for 24 hours showed that the polyacetal-rubber composite specimen of Example 26 retained 80% of the original withdrawal-resisting force.

TABLE 3

| | Oriented polyacetal | | | | Composition of modifying agent | | | Withdrawal force (kgf) | Adhesive strength (g/mm$^2$) |
|---|---|---|---|---|---|---|---|---|---|
| | Tensile elastic modulus (GPa) | Tensile strength (GPa) | Elongation (%) | Diameter (mm) | | | | | |
| Example 21 | 4 | 0.6 | 20~25 | 1.01 | Resorcinol (40 parts) | + | RF liquid (60 parts) | 15.7 | 500 |
| Example 22 | 10 | 1.0 | 14~16 | 0.80 | Resorcinol (40 parts) | + | RF liquid (60 parts) | 17.6 | 700 |
| Example 23 | 20 | 1.3 | 9~11 | 0.65 | Resorcinol (40 parts) | + | RF liquid (60 parts) | 18.4 | 900 |
| Example 24 | 30 | 1.5 | 7~9 | 0.58 | Resorcinol (40 parts) | + | RF liquid (60 parts) | 21.0 | 1150 |
| Example 25 | 40 | 1.7 | 6~8 | 0.50 | Resorcinol (40 parts) | + | RF liquid (60 parts) | 21.0 | 1340 |
| Example 26 | 50 | 1.3 | 4~6 | 0.44 | Resorcinol (40 parts) | + | RF liquid (60 parts) | 18.5 | 1340 |
| Example 27 | 55 | 1.0 | 4~6 | 0.44 | Resorcinol (40 parts) | + | RF liquid (60 parts) | 9.7 | 700 |
| Comparative Example 3 | 40 | 1.7 | 6~8 | 0.50 | RF liquid alone | | | 2.0 | 130 |

EXAMPLES 21-27 AND COMPARATIVE EXAMPLE 3

Oriented polyacetals in filament form having properties shown in Table 3 were each sandblasted with alumina of No. 120 grade, immersed in a mixture of 40 parts of resorcinol and 60 parts of an RF liquid (stated above) for 30 seconds, then taken out, subjected to dry heat treatament at 160° C. for 20 seconds, immersed again in an RFL liquid at 23° C. for 30 seconds, then taken out, dried at 120° C. for 5 minutes, and subjected to dry heat treatment at 160° C. for 5 minutes. Thereafter, rubber adhesion was conducted in the same manner as in Examples 1-7 to prepare composite specimens as shown in FIG. 2. Results of testing these specimens for adhesive strength are shown in Table 3. For comparison, the above procedure was followed but using an RF liquid (Preparation Example 2) as a modifying agent in place of the resorcinol-RF liquid mixture. Results of this comparative experiment are also shown in Table 3.

EXAMPLES 28-34 AND COMPARATIVE EXAMPLE 4

Oriented polyacetals in filament form having properties shown in Table 4 were each sandblasted with alumina of No. 120 grade, immersed in a mixture of 40 parts of resorcinol, 20 parts of an RFL liquid (Preparation Example 3), and 40 parts of water for 30 seconds at 23° C., then taken out, subjected to dry heat treatment at 160° C. for 20 seconds, immersed again in the RFL liquid at 23° C. for 30 seconds, then taken out, dried at 120° C. for 5 minutes, and subjected to dry heat treatment at 160° C. for 5 minutes. Thereafter, rubber adhesion was conducted in the same manner as in Examples 1-7 to prepare composite specimens. Results of testing these specimens for adhesive strength are shown in Table 4. For comparison, the above procedure was followed but using the RFL liquid alone as a modifying agent. Results of this comparative experiment are also shown in Table 4.

TABLE 4

| | Oriented polyacetal | | | | Composition of modifying agent | | | | | Withdrawal force (kgf) | Adhesive strength (g/mm²) |
|---|---|---|---|---|---|---|---|---|---|---|---|
| | Tensile elastic modulus (GPa) | Tensile strength (GPa) | Elongation (%) | Diameter (mm) | | | | | | | |
| Example 28 | 4 | 0.6 | 20~25 | 1.01 | Resorcinol (40 parts) | + | RFL liquid (20 parts) | + | water (40 parts) | 20.4 | 650 |
| Example 29 | 10 | 1.0 | 14~16 | 0.80 | Resorcinol (40 parts) | + | RFL liquid (20 parts) | + | water (40 parts) | 21.4 | 850 |
| Example 30 | 20 | 1.3 | 9~11 | 0.65 | Resorcinol (40 parts) | + | RFL liquid (20 parts) | + | water (40 parts) | 23.5 | 1150 |
| Example 31 | 30 | 1.5 | 7~9 | 0.58 | Resorcinol (40 parts) | + | RFL liquid (20 parts) | + | water (40 parts) | 23.5 | 1300 |
| Example 32 | 40 | 1.7 | 6~8 | 0.50 | Resorcinol (40 parts) | + | RFL liquid (20 parts) | + | water (40 parts) | 23.5 | 1500 |
| Example 33 | 50 | 1.3 | 4~6 | 0.44 | Resorcinol (40 parts) | + | RFL liquid (20 parts) | + | water (40 parts) | 20.7 | 1500 |
| Example 34 | 55 | 1.0 | 4~6 | 0.44 | Resorcinol (40 parts) | + | RFL liquid (20 parts) | + | water (40 parts) | 12.4 | 900 |
| Comparative Example 4 | 40 | 1.7 | 6~8 | 0.50 | RFL liquid alone | | | | | 2.0 | 130 |

As is evident from Table 4, the adhesion to the rubber was enhanced outstandingly by the treatment with the resorcinol-RFL liquid mixture. In Examples 30–33, much rubber clung to the surface-modified oriented polyacetals after withdrawing thereof. The result of a thermal-ageing resistance test at 121° C. for 24 hours showed that the polyacetal-rubber composite specimen of Example 32 retained 80% of the original withdrawal-resisting force.

EXAMPLES 40–43

The same oriented polyacetal in filament form as used in Example 32 was sandblasted with alumina of No. 120 grade. Composite specimens were prepared from this polyacetal according to the procedure of Example 32 except that resorcinol-RFL liquid mixtures having different compositions as shown in Table 6 were used as modifying agents. Results of evaluating the adhesive strengths are shown in Table 6.

TABLE 6

| | Oriented polyacetal | | | | Composition of modifying agent | | | | | Withdrawal force (kgf) | Adhesive strength (g/mm²) |
|---|---|---|---|---|---|---|---|---|---|---|---|
| | Tensile elastic modulus (GPa) | Tensile strength (GPa) | Elongation (%) | Diameter (mm) | | | | | | | |
| Example 40 | 40 | 1.7 | 6-8 | 0.50 | Resorcinol (40 parts) | + | RFL liquid (5 parts) | + | water (55 parts) | 2.0 | 1270 |
| Example 41 | 40 | 1.7 | 6-8 | 0.50 | Resorcinol (40 parts) | + | RFL liquid (10 parts) | + | water (50 parts) | 21.5 | 1370 |
| Example 42 | 40 | 1.7 | 6-8 | 0.50 | Resorcinol (40 parts) | + | RFL liquid (20 parts) | + | water (40 parts) | 23.5 | 1500 |
| Example 43 | 40 | 1.7 | 6-8 | 0.50 | Resorcinol (40 parts) | + | RFL liquid (30 parts) | + | water (30 parts) | 23.5 | 1500 |

EXAMPLES 35–39

The same oriented polyacetal in filament form as used in Example 25 was sandblasted with alumina of No. 120 grade. Then, composite specimens were prepared from this polyacetal according to the procedure of Example 25 except that resorcinol-RF liquid mixtures having different compositions as shown in Table 5 were used as modifying agent. Results of evaluating the adhesive strengths are shown in Table 5.

EXAMPLES 44 and 45

The same oriented polyacetal in filament form as used in Example 5 was sandblasted with alumina of No. 120 grade, immersed in a modifying mixture of one of two phenolic compounds (see Table 7) with an RF liquid (Preparation Example 2) for 30 seconds at 23° C., then taken out, and subjected to dry heat treatment at 160° C. for 20 seconds. Thereafter, RFL treatment and then rubber sticking were conducted in the same manner as

TABLE 5

| | Oriented polyacetal | | | | Composition of modifying agent | | | Withdrawal force (kgf) | Adhesive strength (g/mm²) |
|---|---|---|---|---|---|---|---|---|---|
| | Tensile elastic modulus (GPa) | Tensile strength (GPa) | Elongation (%) | Diameter (mm) | | | | | |
| Example 35 | 40 | 1.7 | 6-8 | 0.50 | Resorcinol (10 parts) | + | RF liquid (90 parts) | 18.5 | 1180 |
| Example 36 | 40 | 1.7 | 6-8 | 0.50 | Resorcinol (20 parts) | + | RF liquid (80 parts) | 19.0 | 1210 |
| Example 37 | 40 | 1.7 | 6-8 | 0.50 | Resorcinol (30 parts) | + | RF liquid (70 parts) | 20.0 | 1270 |
| Example 38 | 40 | 1.7 | 6-8 | 0.50 | Resorcinol (40 parts) | + | RF liquid (60 parts) | 21.0 | 1340 |
| Example 39 | 40 | 1.7 | 6-8 | 0.50 | Resorcinol (50 parts) | + | RF liquid (50 parts) | 21.0 | 1340 | in Example 5, thereby preparing composite specimens. Results of evaluating adhesive strengths are shown in Table 7.

TABLE 7

| | Oriented polyacetal | | | | Composition of modifying agent | | Withdrawal force (kgf) | Adhesive strength (g/mm$^2$) |
| --- | --- | --- | --- | --- | --- | --- | --- | --- |
| | Tensile elastic modulus (GPa) | Tensile strength (GPa) | Elongation (%) | Diameter (mm) | | | | |
| Example 44 | 40 | 1.7 | 6–8 | 0.50 | Catechol (40 parts) | + RF liquid (60 parts) | 10.5 | 670 |
| Example 45 | 40 | 1.7 | 6–8 | 0.50 | Pyrogallol (40 parts) | + RF liquid (60 parts) | 7.1 | 450 |

EXAMPLES 46–48 AND COMPARATIVE EXAMPLES 5

Pellets of Duracon M 25-04 (the registered trademark of an acetal copolymer supplied by Polyplastic Co., Ltd.) were melt-extruded at 190° C. to prepare tubes of 2.4 mm outer diameter and 0.8 mm inner diameter. These tubes were stretched continuously under pressure, yielding oriented polyacetal products having different properties as shown in Table 8. These oriented polyacetals were each sandblasted with alumina of No. 120 grade, immersed in a modifying mixture of 40 parts of resorcinol and 60 parts of an RF liquid (Preparation Example 2) for 30 seconds at 23° C., then taken out, and subjected to dry heat treatment at 160° C. for 20 seconds. Thereafter, RFL treatment and then rubber adhesion were conducted in the same manner as in Examples 21–27, thereby preparing composite specimens. Results of evaluating the adhesive strengths are shown in Table 8.

6, temperature: 180° C., residence time: 1 minute. The thus treated yarns were wound up, yielding surface-modified stretched polyacetal yarns. Their elastic modulus, tensile strength, and adhesive strength (when these yarns were adhered to a rubber) were found to be 34GPa, 1.6GPa, and 1340 g/mm$^2$, respectively. For comparison, a tire cord of 2520d (monofilament size 6d, formed by twisting two 1260d strands, cord diameter 0.56 mm) made of nylon-66 was treated with an RFL liquid stated above according to the ordinary method, and was adhered to the same rubber as used above. The resulting adhesive strength was 970 g/mm$^2$ As shown above, polyacetal cords surface-modified according to the present invention can be adhered more strongly to elastomers than conventional tire cords can be.

EXAMPLE 50

An oriented polyacetal in filament form of 1.00 mm in diameter (tensile elastic modulus 40GPa, tensile strength 1.7GPa, elongation 6-8%) was treated continuously by operating as shown in FIG. 1, but the surface roughening was omitted. Conditions in other sections were as follows: In the activating section 3, modifying

TABLE 8

| | Oriented polyacetal | | | | Composition of modifying agent | | Withdrawal force (kgf) | Adhesive strength (g/mm$^2$) |
| --- | --- | --- | --- | --- | --- | --- | --- | --- |
| | Tensile elastic modulus (GPa) | Tensile strength (GPa) | Elongation (%) | Diameter (mm) | | | | |
| Example 46 | 10 | 1.0 | 14–16 | 0.80 | Resorcinol (40 parts) | + RF liquid (60 parts) | 16.3 | 650 |
| Example 47 | 20 | 1.1 | 9–11 | 0.60 | Resorcinol (40 parts) | + RF liquid (60 parts) | 17.0 | 900 |
| Example 48 | 28 | 1.2 | 7–9 | 0.52 | Resorcinol (40 parts) | + RF liquid (60 parts) | 17.0 | 1050 |
| Comparative Example 5 | 28 | 1.2 | 7–9 | 0.52 | RF liquid alone | | 17.0 | 120 |

EXAMPLE 49

Pellets of Tenac 3010 were extruded through 20 holes of 0.60 mmφ of a spinneret at 200° C. by using an extruder. The extrudates were passed through a water bath and wound up to prepare unstretched yarns each constituted of 20 monofilaments each having a diameter of 0.15 mm. These yarns were stretched continuously under pressure, yielding stretched yarns consisting of 35 μm diameter monofilaments. The yarns were found to have a tensile elastic modulus of 40 GPa, tensile strength of 1.7GPa, and elongations of 6 to 8%. The stretched yarns were treated continuously as shown in FIG. 1, but the surface roughening was omitted. Conditions in the other sections were as follows: In the activating section 3, modifying agent: a resorcinol (40 parts)-RF liquid (60 parts) mixture, residence time: 16 seconds; in the heat treatment section 4, temperature: 160° C., residence time: 20 seconds; in the adhesive applying section 5, adhesive for elastomers: RFL liquid, residence time: 16 seconds; in the heat treatment section agent: melted resorcinol at 120° C., residence time: 0.5 seconds; in the adhesive applying section 5, adhesive: RFL liquid, residence time: 16 seconds; in the heat treatment section 6, temperature: 180° C., residence time: 1 minute. The thus surface-modified oriented polyacetal was wound up. Its elastic modulus, tensile strength, and adhesive strength to a rubber were found to 34GPa, 1.6GPa, and 1150 g/mm$^2$, respectively.

EXAMPLES 51-55

An oriented polyacetal in filament form having properties shown in Table 9 was sandblasted with alumina of No. 80 grade, and contacted with each of the phenolic compounds (solvent-free) shown in Table 9 by dipping, and then air-dried or washed with water. Thereafter, RFL treatment and then rubber adhesion were conducted in the same manner as in Examples 1-7, thereby preparing composite specimens to evaluate the adhesive strengths. Results of the evaluation are shown in Table 9.

TABLE 9

|  | Oriented polyacetal | | | | Modifying agent | Contact temperature (°C.) | Contact time (min) | Withdrawal force (kgf) | Adhesive strength (g/mm$^2$) |
| --- | --- | --- | --- | --- | --- | --- | --- | --- | --- |
|  | Tensile elastic modulus (GPa) | Tensile strength (GPa) | Elongation (%) | Diameter (mm) | | | | | |
| Example 51 | 40 | 1.7 | 6-8 | 1.00 | Phenol | 120 | 3 | 12.9 | 410 |
| Example 52 | 40 | 1.7 | 6-8 | 1.00 | p-Chloro-phenol | 100 | 3 | 15.4 | 490 |
| Example 53 | 40 | 1.7 | 6-8 | 1.00 | m-Cresol | 120 | 3 | 12.9 | 410 |
| Example 54 | 40 | 1.7 | 6-8 | 1.00 | Resorcinol | 110 | 3 | 15.4 | 490 |
| Example 55 | 40 | 1.7 | 6-8 | 1.00 | Pyrogallol | 110 | 3 | 10.8 | 340 |
| Comparative Example 6 | 40 | 1.7 | 6-8 | 1.00 | Acetone | 50 | 3 | 4.0 | 130 |

As can be seen from Table 9, phenolic compounds pertaining to the present invention, as compared with a compound used in Comparative Example 6, can activate the surface of oriented polyacetal remarkably.

EXAMPLE 56

The same oriented polyacetal in filament form as used in Example 5 was sandblasted with alumina of No. 120 grade, immersed in a THF solution of each of several different phenolic compounds for 30 seconds at 23° C., then taken out, and subjected to dry heat treatment at 160° C. for 10 seconds. The treated polyacetals were placed separately in a mold, and a 100° C. mixture of 90 parts of Adiprene L-100 (a prepolymer for polyurethane supplied by Uniroyal Chemical Co.) and 10 parts of 4,4'-methylene-bis(2-chloroaniline), a hardener, was poured into the mold and hardened by heating at 100° C. for 60 minutes, forming composite specimens as shown in FIG. 2 to evaluate the adhesive strengths. Results of the evaluation are shown in Table 10. For comparison, the above procedure was followed but using solvent THF alone for the treatment. The adhesive strength found in this case is also shown in Table 10, from which it is demonstrated that the surface modification according to the present invention is also effective for sticking oriented polyacetals to polyurethane rubber.

TABLE 10

|  | Oriented polyacetal | | | | Composition of modifying agent | | | Withdrawal force (kgf) | Adhesive strength (g/mm$^2$) |
| --- | --- | --- | --- | --- | --- | --- | --- | --- | --- |
|  | Tensile elastic modulus (GPa) | Tensile strength (GPa) | Elongation (%) | Diameter (mm) | | | | | |
| Example 56 | 40 | 1.7 | 6-8 | 0.50 | m-Aminophenol (40 parts) | + | THF (60 parts) | 9.0 | 570 |
| Example 57 | 40 | 1.7 | 6-8 | 0.50 | Phloramine (40 parts) | + | THF (60 parts) | 10.0 | 640 |
| Example 58 | 40 | 1.7 | 6-8 | 0.50 | 3,5-dihydroxy-benzyl alcohol (40 parts) | + | THF (60 parts) | 10.0 | 640 |
| Example 59 | 40 | 1.7 | 6-8 | 0.50 | 3,5-dihydroxy-benzyl chloride (40 parts) | + | THF (60 parts) | 10.0 | 640 |
| Example 60 | 40 | 1.7 | 6-8 | 0.50 | Resorcinol (40 parts) | + 4,4'-methyl-ene-bis(2-chloroaniline) (5 parts) | + THF (55 parts) | 10.0 | 640 |
| Comparative Example 7 | 40 | 1.7 | 6-8 | 0.50 | THF alone | | | 2.0 | 130 |

EXAMPLES 61-71 AND COMPARATIVE EXAMPLE 8

An oriented polyacetal in filament form having properties shown in Table 11 was rubbed uniformly with sandpaper of No. 80 grade, immersed in a THF solution of 40 wt% of various different phenolic compounds for 30 seconds, then taken out, and subjected to dry heat treatment at 160° C. for 10 seconds. An epoxy adhesive (trade name "Araldite"-supplied by Ciba-Geigy Corp.) was applied on the treated polyacetals and cured by dry heat treatment at 100° C. for 10 minutes, forming composite specimens as shown in FIG. 3. The polyacetal pieces in these specimens were withdrawn to evaluate the adhesive strengths. Results of the evaluation are shown in Table 11. For comparison, the above procedure was followed but using solvent THF alone for the treatment.

Table 11 demonstrates that the surface-modified oriented polyacetal and its production process of the present invention are also effective for adhesion to epoxy resin.

TABLE 11

|  | Oriented polyacetal | | | | Phenolic compound (solvent) | | Withdrawal force (kgf) | Adhesive strength (g/mm$^2$) |
| --- | --- | --- | --- | --- | --- | --- | --- | --- |
|  | Tensile elastic modulus (GPa) | Tensile strength (GPa) | Elongation (%) | Diameter (mm) | | | | |
| Example 61 | 40 | 1.7 | 6-8 | 1.0 | Catechor | (THF) | 33.0 | 1050 |
| Example 62 | 40 | 1.7 | 6-8 | 1.0 | p-chlorophenol | (THF) | 32.0 | 1020 |
| Example 63 | 40 | 1.7 | 6-8 | 1.0 | Resorcinol | (THF) | 29.0 | 920 |
| Example 64 | 40 | 1.7 | 6-8 | 1.0 | 3,5-Xylenol | (THF) | 26.6 | 850 |
| Example 65 | 40 | 1.7 | 6-8 | 1.0 | o-Nitrophenol | (THF) | 25.4 | 810 |
| Example 66 | 40 | 1.7 | 6-8 | 1.0 | Phenol | (THF) | 24.4 | 780 |

TABLE 11-continued

| | Oriented polyacetal | | | | Phenolic compound (solvent) | | Withdrawal force (kgf) | Adhesive strength (g/mm²) |
|---|---|---|---|---|---|---|---|---|
| | Tensile elastic modulus (GPa) | Tensile strength (GPa) | Elongation (%) | Diameter (mm) | | | | |
| Example 67 | 40 | 1.7 | 6–8 | 1.0 | 3,5-dihydroxy-benzoic acid | (THF) | 24.0 | 760 |
| Example 68 | 40 | 1.7 | 6–8 | 1.0 | Pyrogallol | (THF) | 21.0 | 670 |
| Example 69 | 40 | 1.7 | 6–8 | 1.0 | Gallic acid | (THF) | 20.0 | 640 |
| Example 70 | 40 | 1.7 | 6–8 | 1.0 | m-Aminophenol | (THF) | 19.5 | 620 |
| Example 71 | 40 | 1.7 | 6–8 | 1.0 | 2,4-Dihydroxy-benzaldehyde | (THF) | 19.0 | 610 |
| Comparative Example 8 | 40 | 1.7 | 6–8 | 1.0 | None | (THF) | 18.0 | 590 |

EXAMPLE 72 AND COMPARATIVE EXAMPLE 9

An oriented polyacetal in filament form of 2.0 mm in diameter (tensile elastic modulus 35GPa, tensile strength 1.6GPa, elongation 5-6%) was rubbed uniformly with sandpaper of No. 80 grade, dipped in a methanolic solution containing 40 wt% of resorcinol for 30 seconds, and then air-dried. A composite specimen as shown in FIG. 3 was prepared by welding or melt-adhering Duracon M 25-04 (the registered trademark of an acetal copolymer supplied by Polyplastic Co., Ltd.) at 175° C. around an end portion of a piece of the treated polyacetal by using an injection molding system. The polyacetal piece was withdrawn from the acetal copolymer resin to evaluate the adhesive strength. The found withdrawal force and adhesive strength were 94.2 Kg and 1500 g/mm², respectively. When no treatment was carried out except rubbing with the same sandpaper, the withdrawal force and adhesive strength were 62.8 Kg and 1000 g/mm², respectively (Comparative Example 9).

EXAMPLE 73

An oriented polyacetal in tape form 0.2 mm thick 5.0 mm wide (tensile elastic modulus 40GPa, tensile strength 1.7GPa, elongation 6-8%) was applied uniformly on the polyacetal tape rubbed with a sand paper previously. Portions 10 mm long of two pieces of the resorcinol-coated tape were stuck together and compressed by a press at 160° C. and 10 Kg/cm² for 10 seconds. The resulting specimen was subjected to a tensile shear test and the stress at rupture and the adhesive strength were evaluated. The found stress and adhesive strength were 75 Kg and 1500 g/mm², respectively.

EXAMPLE 74

An oriented polyacetal fiber of 1.3 mm in diameter (tensile elastic modulus 40GPa, tensile strength 1.7GPa, elongation 5-7%) was treated continuously by operating as shown in FIG. 1. The surface roughening was performed by sandblasting with alumina of No. 120 grade. In the activating section 3, a resorcinol (40 parts)-RF liquid (60 parts) mixture (RF liquid is Preparation Example 2) was applied as a modifying agent in a residence time of 16 seconds; in the heat treatment section 4, the fiber was heated at 160° C. during a residence time of 30 seconds; in the adhesive applying section 5, an RFL liquid (Preparation Example 3) was applied in a residence time of 16 seconds; then in the heat treatment section 6, the fiber was heated at 175° C. under relaxation during a residence time of 2.5 minutes; and the treated fiber was wound up. This fiber was coated with a crude rubber for automotive tire carcasses to prepare a 5-wind bead of 588 mm in diameter. A bicycle tire was formed by using this bead. The tensile stress of the bead portion of this tire was found to be 1015 kg (retention 90%). The bead and the rubber were completely adhered together.

EXAMPLE 75

An oriented polyacetal fiber of 1.3 mm in diameter (tensile elastic modulus 40 GPa, tensile strength 1.7 GPa, elongation 5-7%) was treated continuously by operating as shown in FIG. 1. The surface roughening was performed by sandblasting with alumina of No. 120 grade. In the activating section 3, an aqueous solution of 40 wt% of resorcinol was applied as a modifying agent in a residence time of 16 seconds; in the heat treatment section 4, the fiber was heated at 160° C. during a residence time of 16 seconds; in the adhesive applying section 5, an epoxy adhesive (Registered Trade Mark "Araldite" supplied by Ciba-Geigy Corp.) was applied; then in the heat treatment section 6, the fiber was heated at 175° C. under relaxation during a residence time of 2.5 minutes; and the treated fiber was wound up. An epoxy resin was adhered to this fiber to form a 5-wind bead of 588 mm in diameter. A bicycle tire was formed by using this bead. The tensile stress of the bead portion of this tire was found to be 1015 Kg (retention 90%).

EXAMPLE 76

A twine consisting of 7 oriented polyacetal fibers of 1.0 mm in each diameter (tensile elastic modulus 40 GPa, tensile strength 1.7 GPa, elongation 6-8%) was prepared and sandblasted with alumina of No. 120 grade. An aqueous solution containing 40 wt% of resorcinol was applied on the twine, and dried at 120° C. to coat resorcinol uniformly on the twine. This treated twine was further coated with a polyacetal copolymer (Duracon M 25-04, supplied by Polyplastic Co., Ltd.) by using an extruder, forming a rope. The tensile stress of this rope was found to be 1015 kg (retention 90%) and the core material and the coating material of this rope were completely adhered together. The flexibility and the flexural-fatigue resistance of this rope were improved by a factor of about two over those of the uncoated twine.

EXAMPLE 77

An oriented polyacetal fiber of 0.5 mm in diameter (tensile elastic modulus 40 GPa, tensile strength 1.7 GPa, elongation 6-8%) was sandblasted with alumina of No. 120 grade, immersed in an aqueous solution containing 40 wt% of resorcinol, then taken out, and subjected to dry heat treatment at 160° C. for 20 seconds. The treated fiber was wound 50-wind densely in parallel around a flat frame, and an epoxy resin was adhered on these fibers and cured by hot pressing at 5 kg/cm² and 140° C. for 5 minutes to form a composite sheet 100 mm long, 28 mm wide, and 0.7 mm thick. The longitudinal tensile elastic modulus and the flexural elastic modulus of this sheet were 730 kg/mm² and 570 kg/mm², respectively.

EXAMPLE 78

An oriented polyacetal fiber of 0.5 mm in diameter (tensile elastic modulus 40 GPa, tensile strength 1.7 GPa, elongation 6-8%) was sandblasted with alumina of No. 120 grade, immersed in a modifying agent consisting of 40 parts of resorcinol, 5 parts of 6% cobalt naphthenate, and 55 parts of methanol, then taken out, and subjected to dry heat treatment at 160° C. for 20 seconds. 40 Pieces of fibers cut off from the treated fiber were placed side-by-side in a mold, and a liquid mixture composed of 98 parts of an unsaturated polyester (supplied by Takeda Chemical Industries, Ltd. under the registered trademark of polymal 3308), 0.8 part of 6% cobalt naphthenate, 1.1 parts of methyl ethyl ketone peroxide, and 0.1 part of N,N-dimethylaniline was poured into the mold, cured at 23° C., and then heated at 60° C. for 60 minutes, thereby forming a plate 150 mm long, 10 mm wide, and 4 mm thick. The longitudinal tensile elastic modulus and the flexural elastic modulus of this plate were 820 kg/mm² and 570 kg/mm². In contrast, a similar plate but containing no oriented polyacetal tube showed a tensile elastic modulus of 380 kg/mm² and a flexural elastic modulus of 380 kg/mm².

EXAMPLE 79

An oriented polyacetal fiber of 0.2 mm in diameter (tensile elastic modulus 40 GPa, tensile strength 1.7 GPa, elongation 6-8%) was sandblasted with alumina of No. 240 grade, immersed in an aqueous solution containing 40 wt% of resorcinol for 10 seconds, then taken out, subjected to dry heat treatment at 160° C. for 10 seconds, and cut into pieces 24 mm long. A uniform mixture of 82 parts of these short filaments, 326 parts of Portland cement, 851 parts of sand, 826 parts of coarse aggregate (sand of up to 25 mm in diameter), and 212 parts of water was poured in a mold and left standing to cure, thereby forming a concrete plate. The flexural strength of this plate 28 days later was found to be 350 kg/cm². On the other hand, the flexural strength of a control plate containing no oriented polyacetal, 28 days later, was 250 kg/cm².

EXAMPLE 80

An oriented polyacetal in tape form 0.2 mm thick and 2 mm wide (tensile elastic modulus 40 GPa, tensile strength 1.7 GPa, elongation 6-8%) was sandblasted with alumina of No. 240 grade. This tape was knitted to form a net consisting of 20-mm square lattices. This net was immersed in a methanolic solution of 40 wt% of m-aminophenol for 10 seconds, then taken out, and subjected to dry heat treatment at 160° C. for 10 seconds. An epoxy adhesive (trade name Polymortar E21, supplied by Kowa Kasei Co., Ltd.) for concrete member purposes was applied on the treated net and cured. Three coated nets prepared in this way were superposed at intervals of 2 mm and placed in a mold, and a slurry composed of 600 parts of cement, 1200 parts of sand, and 360 parts of water was poured into the mold and left standing to harden, thereby forming a concrete plate 10 mm thick. The flexural strength of this plate 28 days later was found to be 430 kg/cm². On the other hand, the flexural strength of a control plate containing no oriented polyacetal net, 28 days later, was 230 kg/cm².

We claim:

1. An oriented polyacetal product, characterized in that the surface thereof is partly or entirely coated with a phenolic compound polyacetal composite layer having a first and second side, wherein the side of said composite layer remote from the surface of the oriented polyacetal product is coated with an adhesive for adhering said product to a plastic, an elastomer, cement concrete or asphalt concrete.

2. The oriented polyacetal product according to claim 1 wherein the adhesive is an adhesive for adhering said product to an elastomer and is selected from resorcinol-formaldehyde condensate, resorcinol-formaldehyde-latex, mixture of resorcinol-formaldehyde condensate resorcinol-formaldehyde-latex, urea, melamine, phenolic, polyamide, cyanoacrylate, acrylic, polyester, nitrocellulose, vinyl acetate resin, epoxy resin, vinyl acetal, vinyl alcohol or denatured products thereof.

3. The oriented polyacetal product according to claim 1, wherein the adhesive is an adhesive for adhering said product to a plastic and is selected from epoxy resin, polyacetal resin, polyamide resin, polyester resin, polyolefin resin, urea resin, vinyl chloride resin, vinylidene chloride resin, acrylic resin, phenolic resin, polyvinyl alcohol resin, polystyrene resin or mixtures thereof.

4. The oriented polyacetal product according to claim 1, wherein the adhesive is an adhesive for adhering said product to cement concrete and is selected from cement or epoxy resin.

5. The oriented polyacetal product according to claim 1, wherein the adhesive is an adhesive for adhering said product to asphalt concrete and is selected from asphalt, wax, resorcinol-formaldehyde condensate, resorcinol-formaldehyde-latex or mixture of resorcinol-formaldehyde condensate and resorcinol-formaldehyde-latex.

6. An oriented polyacetal product, characterized in that the surface thereof is partly or entirely coated with a phenolic compound composite layer having a first and second side, wherein the side of said composite layer remote from the surface of the oriented polyacetal product is coated with a resorcinol-formaldehyde condensate adhesive and a polyacetal resin adhesive.

7. An oriented polyacetal product, characterized in that the surface thereof is partly or entirely coated with a phenolic compound composite layer having a first and second side, wherein the side of said composite layer remote from the surface of the oriented polyacetal product is coated with a resorcinol-formaldehyde-latex adhesive and a polyacetal resin adhesive.

8. An elastomer or plastic product which is reinforced by the oriented polyacetal product as claimed in claim 1, 2, 6, 7, 3, 4 or 6.

9. A tire bead comprising the oriented polyacetal product as claimed in claim 1, 2, 6, 7, 3, 4 or 5.

10. A rope, cable or cord comprising the oriented polyacetal product as claimed in claim 1, 2, 6, 7, 3, 4 or 5.

* * * * *